(12) United States Patent
Miyagi et al.

(10) Patent No.: US 8,456,813 B2
(45) Date of Patent: Jun. 4, 2013

(54) OPTICAL DISC REPRODUCTION APPARATUS

(75) Inventors: Junji Miyagi, Daito (JP); Hideki Kume, Daito (JP); Mari Muroi, Daito (JP); Takayuki Yamamoto, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 198 days.

(21) Appl. No.: 12/979,749

(22) Filed: Dec. 28, 2010

(65) Prior Publication Data

US 2011/0164360 A1 Jul. 7, 2011

(30) Foreign Application Priority Data

Jan. 6, 2010 (JP) ................................ 2010-001590

(51) Int. Cl.
*H05K 5/00* (2006.01)
*H05K 7/00* (2006.01)

(52) U.S. Cl.
USPC ............ 361/679.01; 361/679.04; 361/679.06; 361/679.07; 361/679.27; 361/679.28

(58) Field of Classification Search
USPC ............. 361/679.01, 679.02, 679.08, 679.09, 361/679.3, 679.55–679.59; 345/156, 157, 345/168, 169, 184; 455/575.1, 575.3, 575.4, 455/575.8

See application file for complete search history.

(56) References Cited

U.S. PATENT DOCUMENTS

| 5,583,744 A | 12/1996 | Oguchi et al. |
| 5,594,617 A | 1/1997 | Foster et al. |
| 5,901,035 A | 5/1999 | Foster et al. |
| 6,385,041 B1 | 5/2002 | Choi |
| 6,535,378 B1 * | 3/2003 | Oguchi et al. ........... 361/679.55 |
| 2004/0042159 A1 | 3/2004 | Yang et al. |
| 2007/0047192 A1 * | 3/2007 | Kobayashi et al. ........... 361/683 |

FOREIGN PATENT DOCUMENTS

| JP | 8-76898 | 3/1996 |
| JP | 3025417 U | 6/1996 |
| JP | 11-134065 | 5/1999 |
| JP | 3407990 B | 3/2003 |
| JP | 2005-165637 | 6/2005 |

OTHER PUBLICATIONS

Communication from the European Patent Office dated Oct. 23, 2012 in a European counterpart application.

* cited by examiner

*Primary Examiner* — Jayprakash N Gandhi
*Assistant Examiner* — Jerry Wu
(74) *Attorney, Agent, or Firm* — Morgan, Lewis & Bockius LLP

(57) ABSTRACT

An optical disc reproduction apparatus includes a main body, a display unit, a two-axis hinge, and a battery pack. The two-axis hinge has a joint member to connect the two-axis hinge to the main body. The main body has not only a hinge mounting-housing portion to attach and house the joint member of the two-axis hinge but also a housing recess to house a battery housing of the battery pack on right and left sides of the hinge mounting-housing portion on a back end. The battery pack has a U-shaped recess in a center. The recess is located in a position corresponding to the hinge mounting-housing portion in the main body and has a width larger than that of the hinge mounting-housing portion in a rightward-leftward direction.

6 Claims, 2 Drawing Sheets

OPTICAL DISC REPRODUCTION APPARATUS

BACKGROUND OF THE INVENTION

1. Field of the Invention

The present invention relates to an optical disc reproduction apparatus which reproduces an image recorded in an optical disc such as blu-ray disc and DVD (Digital Versatile Disc), for example.

2. Description of the Related Art

Recently, in a field of a portable optical disc reproduction apparatus, there is a known optical disc reproduction apparatus which includes a main body having an optical disc reproduction unit and a liquid crystal display unit for displaying an image reproduced by the optical disc reproduction unit, and the main body and the liquid crystal display unit is rotatably and pivotally connected by a two-axis hinge, that is, the liquid crystal display unit can rotate, open, and close with respect to the main body. Here, "rotation (rotatably)" means horizontal rotation of the liquid crystal display unit, and "pivoting (pivotally)" means back and forth rotation of the liquid crystal display unit (rotating about a rotation axis extending in a horizontal direction). The two-axis hinge has a joint member to the main body in addition to a hinge mechanism, and at least the joint member out of the above members is housed in the main body. Thus, it is necessary to have a space for housing not only the optical disc reproduction unit and a control board but also the joint member of the two-axis hinge in a chassis of the main body in the portable optical disc reproduction apparatus.

Moreover, the portable optical disc reproduction apparatus requires a battery pack. Many of the battery packs are mounted on a back end of the main body in the same manner as the two-axis hinge. Accordingly, in the back end of the main body, the two-axis hinge and the battery back should be efficiently housed in the chassis of the main body to make the portable optical disc reproduction apparatus smaller and thinner.

In some of the above type of apparatuses, a prismatic secondary battery is often used as a secondary battery in the battery pack to house the two-axis hinge and the battery pack in the chassis of the main body efficiently. As shown in FIGS. 1, 4, and 5 of Japanese Laid-Open Patent Publication No. 11-134065 and Japanese Laid-Open Patent Publication No. 2005-165637, there is also a known apparatus in which the battery pack is located avoiding a bottom of the hinge which is located in right and left edges of the back end of the main body, and moreover, as shown in Registered Utility Model No. 3025417 and Japanese Laid-Open Patent Publication No. 8-76898, there is also a known apparatus in which the battery pack is connected to the back end of the main body.

Although the above apparatus which uses the prismatic secondary battery as the secondary battery in the battery pack can be thin, the prismatic secondary battery is more expensive than a cylindrical secondary battery, so that a production cost of the whole apparatus rises. Moreover, in the inventions described in FIGS. 1, 4, and 5 of Publication No. 11-134065 and Publication No. 2005-165637, the battery pack can be located avoiding the bottom of the hinge when the hinge is located in the right and left edges of the back end of the main body as in the case of using one-axis hinge, however, the battery pack cannot be located avoiding the bottom of the hinge when the hinge is located in a center of the back end of the main body as in the case of using the two-axis hinge. In claim 2 of Publication No. 11-134065, there is a description of providing an applied part of the battery pack on both sides of the main body so that the hinge is located between the applied part, however, when the battery pack having uniform height is located on the both sides of the main body to put the hinge between the battery pack as described in FIG. 5 of Publication No. 11-134065, the battery pack has to be separated into at least two parts. When the battery pack is separated into at least two parts, it is impossible to commonalize a circuit board for charging and discharging the plural secondary batteries in the battery pack, so that a production cost of the whole apparatus rises. Furthermore, as for the apparatus in which the battery pack is connected to the back end of the main body as shown in Registered Utility Model No. 3025417 and Japanese Laid-Open Patent Publication No. 8-76898, the main body is large in a front/back width, so that the main body gets larger and such an apparatus lacks portability.

In a field of the above type of the apparatus, there is a known apparatus in which the battery pack has a recess along a pivoting axis of a hinge mechanism (an axis about which the hinge mechanism turns) so that at least a part of the hinge mechanism along the pivoting axis is stored in the recess of the battery pack (refer to Japan Patent No. 3407990). However, this type of apparatus can be reduced in thickness for only a part of a diameter of the pivoting axis of the hinge mechanism at most, so that it is possible to reduce a thickness of a portable information processing apparatus provided with the one-axis hinge in which a part of pivoting axis of the hinge mechanism forms a hinge joint member to the main body, however, it is not possible to reduce a thickness of the apparatus provided with the two-axis hinge in which the hinge joint member to the main body is formed separately from the part of the hinge mechanism. Moreover, in this apparatus, the part of pivoting axis of the hinge mechanism is stored in the recess of the battery pack when attaching the battery pack to the main body, so that the battery pack cannot be attached to and detached from the main body in the horizontal direction.

SUMMARY OF THE INVENTION

The present invention is to solve the problem described above, and an object of the present invention is to provide an optical disc reproduction apparatus which can efficiently house a two-axis hinge and a battery pack in a main body to make the apparatus smaller and thinner even though the two-axis hinge is located in a center of a back end of the main body, so that portability of the apparatus can be improved, and moreover, a rise in production cost of the whole apparatus can be prevented.

According to the present invention, this object is achieved by an optical disc reproduction apparatus, comprising: a main body which has an optical disc reproduction unit to reproduce an image recorded in an optical disc; a display unit which displays the image reproduced by the optical disc reproduction unit; a two-axis hinge which connects the main body and the display unit rotatably and pivotally; and a battery pack which can be attached to and detached from a back end of the main body and supplies electrical power to the main body and the display unit.

The two-axis hinge has a joint member to connect the two-axis hinge to the main body.

The main body has not only a hinge mounting-housing portion to attach and house the joint member of the two-axis hinge in a center of the back end, but also a housing recess to house a battery housing of the battery pack on right and left sides of the hinge mounting-housing portion on the back end.

The battery pack has a U-shaped recess in its center.

The recess is located in a position corresponding to the hinge mounting-housing portion in the main body, and has a width larger than that of the hinge mounting-housing portion in a rightward-leftward direction.

According to the above configuration, the recess in the battery pack is located in a position corresponding to the hinge mounting-housing portion in the main body, and has the width larger than that of the hinge mounting-housing portion in the rightward-leftward direction, and moreover, the housing recess which houses the battery housing of the battery pack on right and left sides of the hinge mounting-housing portion on the back end of the main body. Thus, the two-axis hinge and the battery pack attached to the center of the back end of the main body can be housed in the main body efficiently, and the apparatus can be made smaller and thinner. As a result, portability of the apparatus can be improved. Moreover, in contrast to the case that the battery packs are separately provided on the both sides of the main body so that the hinge is located between the battery packs as described in claim 2 of Japanese Laid-Open Patent Publication No. 11-134065, the circuit board for charging and discharging the plural cylindrical secondary batteries in the battery pack can be commonalized, and the rise in the production cost of the whole apparatus can be prevented. Furthermore, the housing recesses are provided on the right and left sides of the hinge mounting-housing portion in the back end of the main body to house the battery housings in the battery pack, so that a weight of the whole apparatus can be well-balanced.

It is preferable that the battery pack has two battery housings in total on its both ends in a longitudinal direction, and the battery housings house plural cylindrical secondary batteries, respectively. According to the above configuration, the apparatus can be made thinner without using an expensive prismatic secondary battery, so that the rise in the production cost of the whole apparatus can be prevented.

It is more preferable that the battery pack has a circuit board for charging and discharging all the cylindrical secondary batteries housed in the two battery housings in common in the recess. According to the above configuration, the rise in the production cost of the whole apparatus can be reliably prevented.

It is preferable that the housing recess in the main body has a guide bar to attach the battery pack, a longitudinal direction of the guide bar is a direction parallel to a horizontal surface when putting the main body on the horizontal surface, the battery pack has a guide groove into which the guide bar can be inserted, and upper surfaces of the battery housings in the battery pack are flat and parallel to a longitudinal direction of the guide groove. According to the above configuration, when the battery pack is attached to and detached from the main body while putting the main body on the horizontal surface, the longitudinal direction of the guide bar provided on the housing recess in the main body, the longitudinal direction of the guide groove provided in the battery pack, and the upper surfaces of the battery housings in the battery pack are parallel to the horizontal surface, so that in contrast to the invention described in the above Japan Patent No. 3407990, the battery pack can be easily attached to and detached from the main body in the horizontal direction.

BRIEF DESCRIPTION OF THE DRAWINGS

The present invention will be described below with reference to the annexed drawings. It is to be noted that all the drawings are shown for the purpose of illustrating the technical concept of the present invention or embodiments thereof, wherein.

DESCRIPTION OF THE PREFERRED EMBODIMENTS

Figure 1:
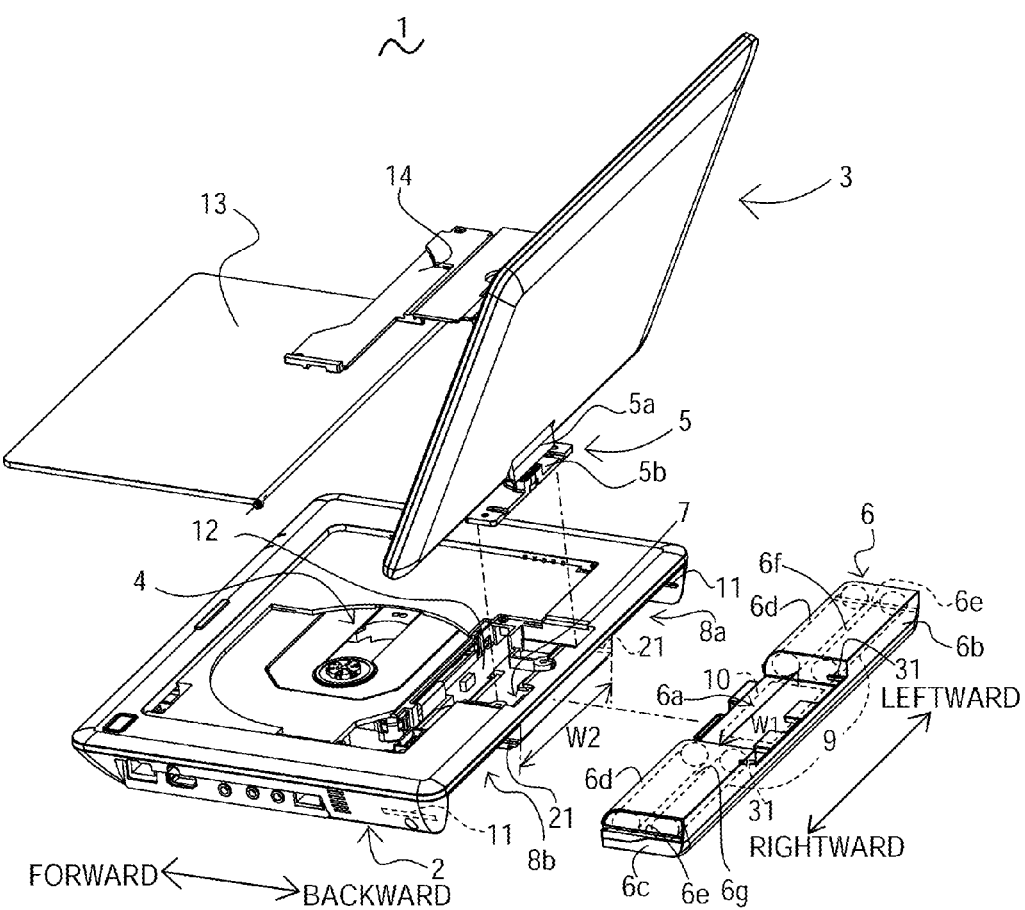
FIG. 1 is an exploded perspective view of an optical disc reproduction apparatus according to a preferred embodiment of the present invention.

A preferred embodiment of the present invention is described with reference to FIGS. 1 and 2. FIG. 1 is an exploded perspective view of an optical disc reproduction apparatus according to the present preferred embodiment. In the following description and claims, a forward (direction), a backward (direction), a rightward (direction), and a leftward (direction) correspond to forward-backward and rightward-leftward directions indicated by arrows in FIG. 1, respectively. An optical disc reproduction apparatus 1 is made up of a main body 2 which has an optical disc reproduction unit 4 to reproduce an image recorded in an optical disc such as a blu-ray disc, a control board 12 to control the whole apparatus, and a liquid crystal display unit 3 (the display unit in claim) to display an image reproduced by the optical disc reproduction unit 4. The main body 2 and the liquid crystal display unit 3 is rotatably and pivotally connected to each other by a two-axis hinge 5, that is, the liquid crystal display unit 3 can rotate, open, and close with respect to the main body 2. In other words, the two-axis hinge 5 connects the main body 2 and the liquid crystal display unit 3, and the main body 2 supports the liquid crystal display unit 3 rotatably and pivotally by using the two-axis hinge 5. Here, "rotation (rotatably)" means horizontal rotation of the liquid crystal display unit 3, and "pivoting (pivotally)" means back and forth (indicated by the arrows in FIG. 1) rotation of the liquid crystal display unit 3 (rotating about a rotation axis of the two-axis hinge 2 extending in the horizontal direction). The optical disc reproduction apparatus 1 is portable. When a user takes along the optical disc reproduction apparatus 1, the liquid crystal display unit 3 is folded back on the main body 2 by rotating (pivoting) the two-axis hinge 5 about the rotation axis (pivoting axis) in the horizontal direction to rotate (pivot) the liquid crystal display unit 3 forward.

The two-axis hinge 5 has a hinge mechanical unit 5a and a joint member 5b for connecting the two-axis hinge 5 to the main body 2. The main body 2 has a hinge mounting-housing portion 7 which is a recess to attach and house the joint member 5b of the two-axis hinge 5 in a center of a back end of the main body 2. An electrical wiring which connects the main body 2 and the liquid crystal display unit 3 electrically is also housed in the hinge mounting-housing portion 7. The electrical wiring goes through the two-axis hinge 5 to connect the main body 2 and the liquid crystal display unit 3 electrically. After the two-axis hinge 5 is attached to the main body 2 and the electrical wiring connection to the main body 2 is completed, an upper portion of the hinge mounting-housing portion 7 is covered with a cover 14.

The main body 2 has an inner cover 13 which protects the optical disc reproduction unit 4 and the optical disc attached to the optical disc reproduction unit 4. When taking along the optical disc reproduction apparatus 1 or reproducing the image by the optical disc reproduction unit 4, the inner cover 13 is closed to cover and protect the optical disc reproduction unit 4 and the optical disc attached to the optical disc reproduction unit 4.

The optical disc reproduction apparatus 1 has a battery pack 6 which can be attached to and detached from the back end of the main body 2 and supplies electrical power to the main body 2 and the liquid crystal display unit 3. The battery pack 6 has a U-shaped recess 6a in its center. The battery pack 6 also has two battery housings in total (a left battery housing 6b and a right battery housing 6c in FIG. 1) on its both sides (right and left edges) in a longitudinal direction, and the left battery housing 6b and the right battery housing 6c house plural cylindrical secondary batteries 9, respectively. Moreover, the battery pack 6 has a circuit board 10 in the recess 6a to charge and discharge all the cylindrical secondary batteries 9 housed in the left battery housing 6b and the right battery housing 6c in common.

Next, a structural feature of the battery pack 6 and the main body 2 for housing efficiently the battery pack 6 in the main body 2 is described. The recess 6a in the battery pack 6 is located in a position corresponding to the hinge mounting-housing portion 7 in the main body 2 (that is, the location of the recess 6a is right below the hinge mounting-housing portion 7 when attaching the battery pack 6 to the main body 2) and has a width W1 in the rightward-leftward direction larger than a width W2 of the hinge mounting-housing portion 7 in the rightward-leftward direction. The main body 2 has a left housing recess 8a and a right housing recess 8b in right and left sides of the hinge mounting-housing portion 7 on the back end to house the left battery housing 6b and the right battery housing 6c in the battery pack 6. According to the above configuration, the two-axis hinge 5 and the battery pack 6 attached to the center of the back end of the main body 2 can be efficiently housed in the back of the main body 2, and the whole optical disc reproduction apparatus 1 can be made smaller and thinner.

Figure 2:
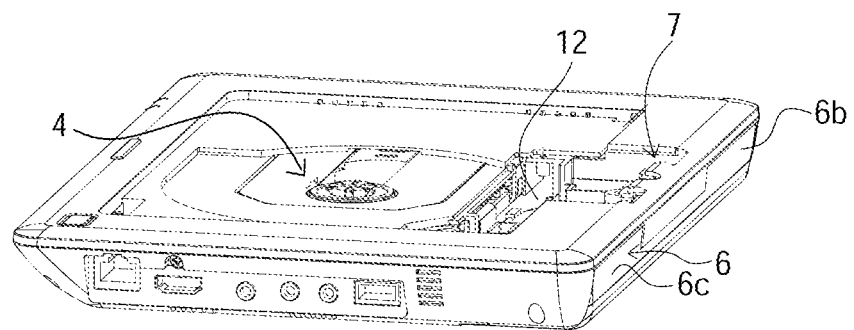
FIG. 2 is a perspective view of a main body in FIG. 1 to which a battery pack is attached.

FIG. 2 shows the main body 2 to which the battery pack 6 is attached. As shown in FIG. 2, the above structural feature enables the battery pack 6 to be efficiently housed in the back of the main body 2.

Next, a structural feature of the battery pack 6 and the main body 2 for easily attaching/detaching the above battery pack 6 to/from the main body 2 in the horizontal direction is described. As shown in FIG. 1, a guide bar 11 and a guide groove 21 is provided on internal surfaces of the left housing recess 8a and the right housing recess 8b in the main body 2 to attach the battery pack 6. A longitudinal direction of the guide bar 11 and the guide groove 21 is a direction (the forward-backward direction indicated by the arrows in FIG. 1) parallel to a horizontal surface when putting the main body 2 on the horizontal surface. On the other hand, the battery pack 6 has a guide groove 6e into which the guide bar 11 can be inserted on its right lateral side and left lateral side. Moreover, a guide rail 31 is provided on a right lateral side of the left battery housing 6b and a left lateral side of the right battery housing 6c in the battery pack 6 so that it can be inserted into the guide groove 21 of the main body 2. Furthermore, upper surfaces 6f and 6g of the left and right battery housings 6b and 6c in the battery pack 6 are both flat and parallel to a longitudinal direction of the guide groove 6e and the guide rail 31.

According to the above configuration, when the battery pack 6 is attached to and detached from the main body 2 while putting the main body 2 on the horizontal surface, the longitudinal direction of the guide bar 11 and the guide groove 21 provided on the internal surfaces of the left housing recess 8a and the right housing recess 8b in the main body 2, the longitudinal direction of the guide groove 6e and the guide rail 31 provided in the battery pack 6, and the upper surfaces 6f and 6g of the left and right battery housings 6b and 6c in the battery pack 6 are parallel to the horizontal surface, so that in contrast to the invention described in the above Japan Patent No. 3407990, the battery pack 6 can be easily attached to and detached from the main body 2 in the horizontal direction.

As described above, according to the optical disc reproduction apparatus 1 of the present preferred embodiment, the recess 6a in the battery pack 6 is located in a position corresponding to the hinge mounting-housing portion 7 in the main body 2, and the recess 6a has the width W1 in the rightward-leftward direction larger than the width W2 of the hinge mounting-housing portion 7 in the rightward-leftward direction, and moreover, the left housing recess 8a and the right housing recess 8b are provided on the right and left sides of the hinge mounting-housing portion 7 in the back end of the main body 2 to house the left battery housing 6b and the right battery housing 6c in the battery pack 6. According to the above configuration, the two-axis hinge 5 and the battery pack 6 attached to the center of the back end of the main body 2 can be efficiently housed in the main body 2, so that the apparatus can be made smaller and thinner, and portability of the apparatus can be improved. As a result, portability of the optical disc reproduction apparatus 1 can be improved. Moreover, in contrast to the case that the battery packs are separately provided on the both sides of the main body so that the hinge is located between the battery packs as described in claim 2 of Japanese Laid-Open Patent Publication No. 11-134065, all the cylindrical secondary batteries 9 in the battery pack 6 can be electrically connected to each other, so that the circuit board 10 for charging and discharging all the cylindrical secondary batteries 9 can be commonalized, and the rise in production cost of the whole apparatus can be prevented. Furthermore, the left housing recess 8a and the right housing recess 8b are provided on the right and left sides of the hinge mounting-housing portion 7 in the back end of the main body 2 to house the left battery housing 6b and the right battery housing 6c in the battery pack 6, so that a weight of the whole apparatus can be well-balanced.

Moreover, the apparatus can be made thinner without using the expensive prismatic secondary battery, so that the rise in production cost of the whole apparatus can be prevented.

The present invention is not limited to the configuration of the above preferred embodiment, however, various modification are applicable within the scope of the invention. For example, in the above preferred embodiment, the example of applying the liquid crystal display unit to the display unit in claims is described, however, the display unit is not limited to the liquid crystal display unit, but a plasma display unit or an organic EL (electroluminescence) display unit can also be applied, for example. Moreover, in the above preferred embodiment, the battery pack has the common circuit board for charging and discharging all the cylindrical secondary batteries in the recess, however, the common circuit board for charging and discharging all the batteries can also be provided in the internal surface or the bottom surface of the left battery housing or the right battery housing. Moreover, in the above preferred embodiment, there is the example that each of the guide bars 11 which are provided on the internal surfaces of the left housing recess 8a and the right housing recess 8b in the main body 2 forms one line, however, not only one line but also plural lines in vertical direction or the forward-backward direction are also applicable as long as the longitudinal direction of the guide bar is parallel to the longitudinal direction of the guide groove in the battery pack and the upper surface of the right and left battery housings in the battery pack. Furthermore, in the above preferred embodiment, the example of attaching/detaching the battery pack 6 to/from the main body 2 in the horizontal direction is described, however, the battery pack can also be attached to the main body by moving the battery pack in the forward direction in FIG. 1 horizontally after lifting up the battery pack from an underside of the main body. In this case, it is preferable that each of the guide bars on the main body has an inverted L shape and each guide grooves in the battery pack has a L shape. Thus, the guide bar on the main body is inserted into the guide groove in the battery pack, the battery pack can be moved along the guide bar. According to the above configuration, the battery pack can smoothly be attached to the main body.

What is claimed is:

1. An optical disc reproduction apparatus, comprising:
   a main body which has an optical disc reproduction unit to reproduce an image recorded in an optical disc;
   a display unit which displays the image reproduced by the optical disc reproduction unit;
   a two-axis hinge which connects the main body and the display unit rotatably and pivotally; and
   a battery pack which can be attached to and detached from a back end of the main body and supplies electrical power to the main body and the display unit,
   wherein the two-axis hinge has a joint member to connect the two-axis hinge to the main body,
   wherein the main body has not only a hinge mounting-housing portion to attach and house the joint member of the two-axis hinge in a center of the back end, but also a housing recess to house a battery housing of the battery pack on right and left sides of the hinge mounting-housing portion on the back end,
   wherein the housing recess houses the whole of the battery housing so that a part of the battery housing does not project below the underside of the main body, and so that a part of the battery housing does not project from the back end of the main body,
   wherein the battery pack has a U-shaped recess in its center, and
   wherein the recess is located in a position corresponding to the hinge mounting-housing portion in the main body, and has a width larger than that of the hinge mounting-housing portion in a rightward-leftward direction.

2. The optical disc reproduction apparatus according to claim 1,
   wherein the battery pack has two battery housings in total on its both ends in a longitudinal direction, and the battery housings house plural cylindrical secondary batteries, respectively.

3. The optical disc reproduction apparatus according to claim 2,
   wherein the battery pack has a circuit board for charging and discharging all the cylindrical secondary batteries housed in the two battery housings in common in the recess.

4. The optical disc reproduction apparatus according to claim 3,
   wherein the housing recess in the main body has a guide bar to attach the battery pack,
   wherein a longitudinal direction of the guide bar is a direction parallel to a horizontal surface when putting the main body on the horizontal surface, and
   wherein the battery pack has a guide groove into which the guide bar can be inserted.

5. The optical disc reproduction apparatus according to claim 2,
   wherein the housing recess in the main body has a guide bar to attach the battery pack,
   wherein a longitudinal direction of the guide bar is a direction parallel to a horizontal surface when putting the main body on the horizontal surface, and
   wherein the battery pack has a guide groove into which the guide bar can be inserted.

6. The optical disc reproduction apparatus according to claim 1,
   wherein the housing recess in the main body has a guide bar to attach the battery pack,
   wherein a longitudinal direction of the guide bar is a direction parallel to a horizontal surface when putting the main body on the horizontal surface, and
   wherein the battery pack has a guide groove into which the guide bar can be inserted.

* * * * *